(12) United States Patent
Gallay et al.

(10) Patent No.: US 7,511,941 B1
(45) Date of Patent: Mar. 31, 2009

(54) ULTRASONIC SEALED FILL HOLE

(75) Inventors: Roland Gallay, Favagny-le-Petit (CH); Daniel Schlunke, Chatonnaye (CH)

(73) Assignee: Maxwell Technologies, Inc., San Diego, CA (US)

( * ) Notice: Subject to any disclaimer, the term of this patent is extended or adjusted under 35 U.S.C. 154(b) by 312 days.

(21) Appl. No.: 11/297,668

(22) Filed: Dec. 8, 2005

Related U.S. Application Data

(60) Provisional application No. 60/688,557, filed on Jun. 8, 2005.

(51) Int. Cl.
*H01G 9/00* (2006.01)

(52) U.S. Cl. .................. 361/502; 361/503; 361/504; 361/508; 361/512; 361/523

(58) Field of Classification Search .............. 361/502, 361/503–504, 508–512, 516–519, 523–534
See application file for complete search history.

(56) References Cited

U.S. PATENT DOCUMENTS

| | | | |
|---|---|---|---|
| 2,997,414 A * | 8/1961 | Netherwood et al. | 264/267 |
| 4,459,641 A | 7/1984 | Giacomello | |
| 4,538,025 A | 8/1985 | Coe et al. | |
| 5,847,919 A * | 12/1998 | Shimizu et al. | 361/517 |
| 6,275,372 B1 | 8/2001 | Vassallo et al. | |
| 6,282,081 B1 | 8/2001 | Takabayashi et al. | |
| 6,310,756 B1 | 10/2001 | Miura et al. | |
| 6,445,567 B1 * | 9/2002 | Komatsuki et al. | 361/518 |
| 6,487,067 B1 * | 11/2002 | Holder | 361/519 |
| 6,603,653 B2 | 8/2003 | Matsuoka et al. | |
| 6,627,252 B1 * | 9/2003 | Nanjundiah et al. | 427/79 |
| 6,631,074 B2 | 10/2003 | Bendale et al. | |
| 7,274,551 B1 * | 9/2007 | Parler et al. | 361/518 |
| 2004/0032698 A1 | 2/2004 | Paul et al. | |

* cited by examiner

*Primary Examiner*—Nguyen T Ha
(74) *Attorney, Agent, or Firm*—Hensley Kim & Holzer, LLC

(57) ABSTRACT

A method and implementation for improved performance and sealing of an energy storage device are disclosed.

21 Claims, 14 Drawing Sheets

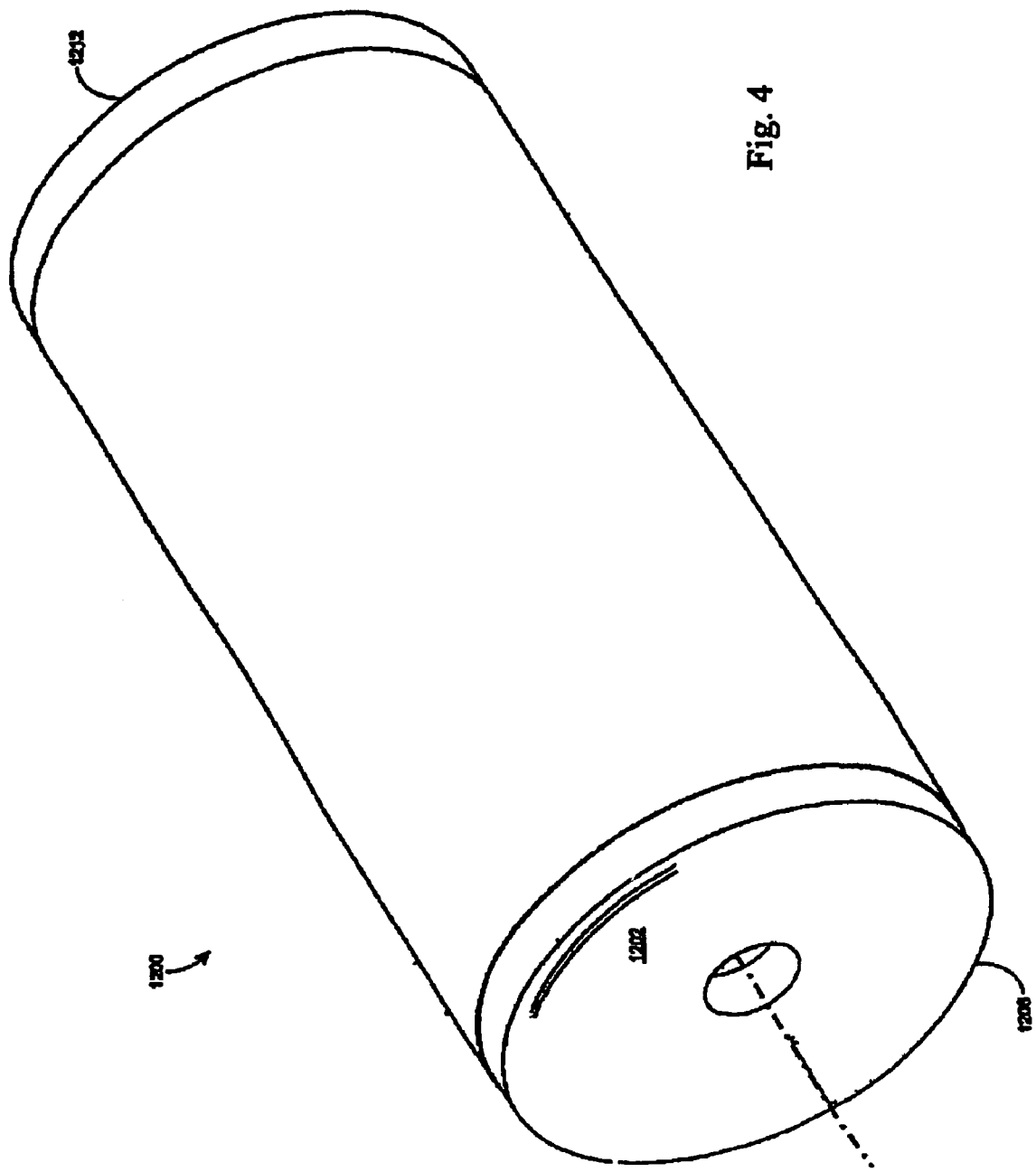

Figure 1:
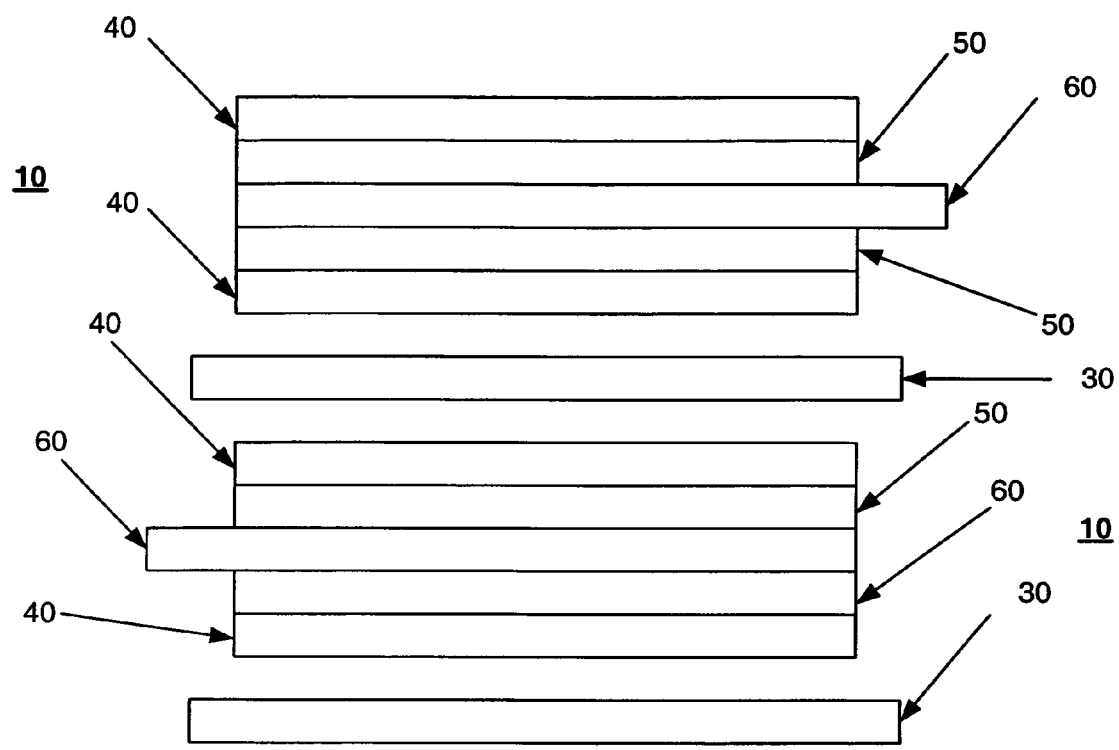

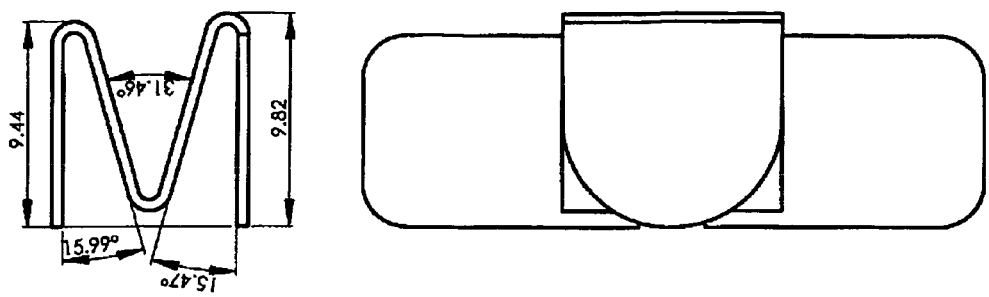
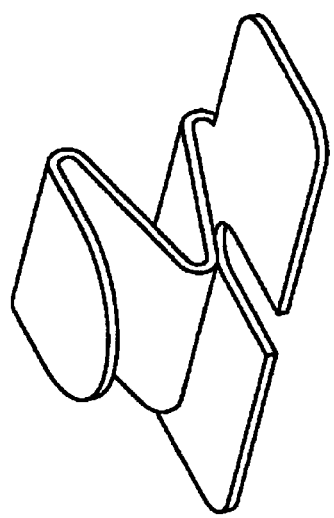
Fig. 5d
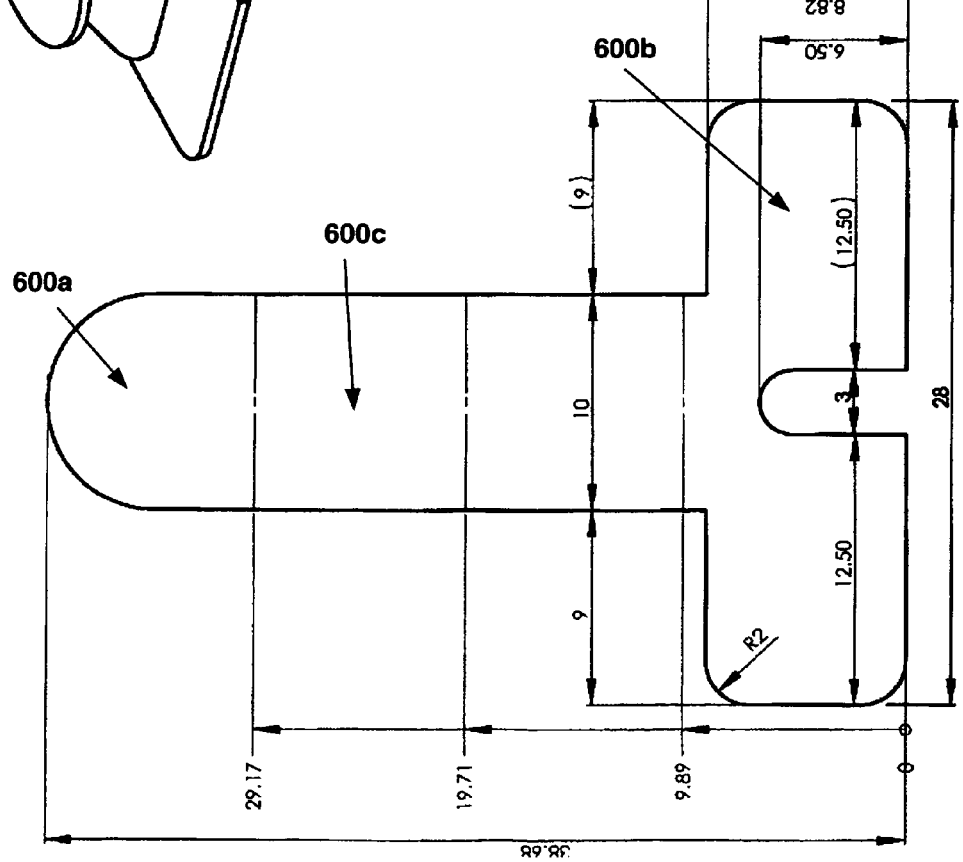

ULTRASONIC SEALED FILL HOLE

RELATED AND PRIORITY DOCUMENTS

The present application is related to and claims priority from commonly assigned Provisional Application filed on Jun. 8, 2005, with Ser. No. 60/688,557.

FIELD OF THE INVENTION

The subject matter of this application relates generally to capacitors and capacitor housings and relates more particularly to double-layer capacitors and double-layer capacitor housings and sealing used therewith.

BACKGROUND

Conventional capacitor technology is well known to those skilled in the art. The energy and power density that can be provided by conventional capacitor technology is typically low, for example, conventional capacitors are typically capable of providing less than 0.1 Wh/kg. Applications that require greater energy density from an energy source, therefore, typically do not rely on conventional capacitor technology. The amount of energy delivered by conventional capacitor technology can be increased, but only by increasing the number of capacitors.

Both conventional and double-layer capacitors are typically contained in a housing. The design of the housings and the capacitors as described herein below provide improvements over that of the prior art.

SUMMARY

In one embodiment, an energy storage device may comprise a housing, the housing including a fill hole; and a seal, wherein the seal is placed against the fill hole and seals an interior of the housing from an exterior of the housing, and wherein the seal does not protrude within the interior of the housing. Both the housing and the seal may comprise a metal. The metal may comprise aluminum. The seal and the housing may be joined by a weld. The seal and housing may be joined by an ultrasonic weld. The seal may make direct surface to surface contact with the housing. The fluid may comprise an electrolyte. The electrolyte may comprise acetonitrile. The device may be an ultracapacitor.

In one embodiment, a capacitor may comprise a housing, the housing including a fill hole; and a seal, wherein the seal is positioned against the fill hole and seals an interior of the housing from an exterior of the housing, and wherein the seal is joined to the housing by an ultrasonic weld. The housing and the seal may comprise metal. The housing and the seal may make direct surface to surface contact. The housing may contain acetonitrile. In one embodiment, the seal does not extend within the fill hole. In one embodiment, the seal does not extend within an interior of the housing. The seal may be aligned along an axis of the housing. Within the housing there may be disposed a jelly-roll type electrode.

In one embodiment, a method of manufacturing an energy storage device may comprise providing a metal housing, the housing including a fill hole; providing a metal seal; placing the metal seal against the fill hole; and ultrasonically welding the metal seal to the metal housing. Prior to welding, the housing may be filled with an electrolyte. The energy storage device may comprise an ultracapacitor. The metal housing and the metal seal may comprise aluminum.

Other embodiments, objects, and advantages will become apparent upon a further reading of the specification, figures, and claims.

FIGURES

Figure 2:
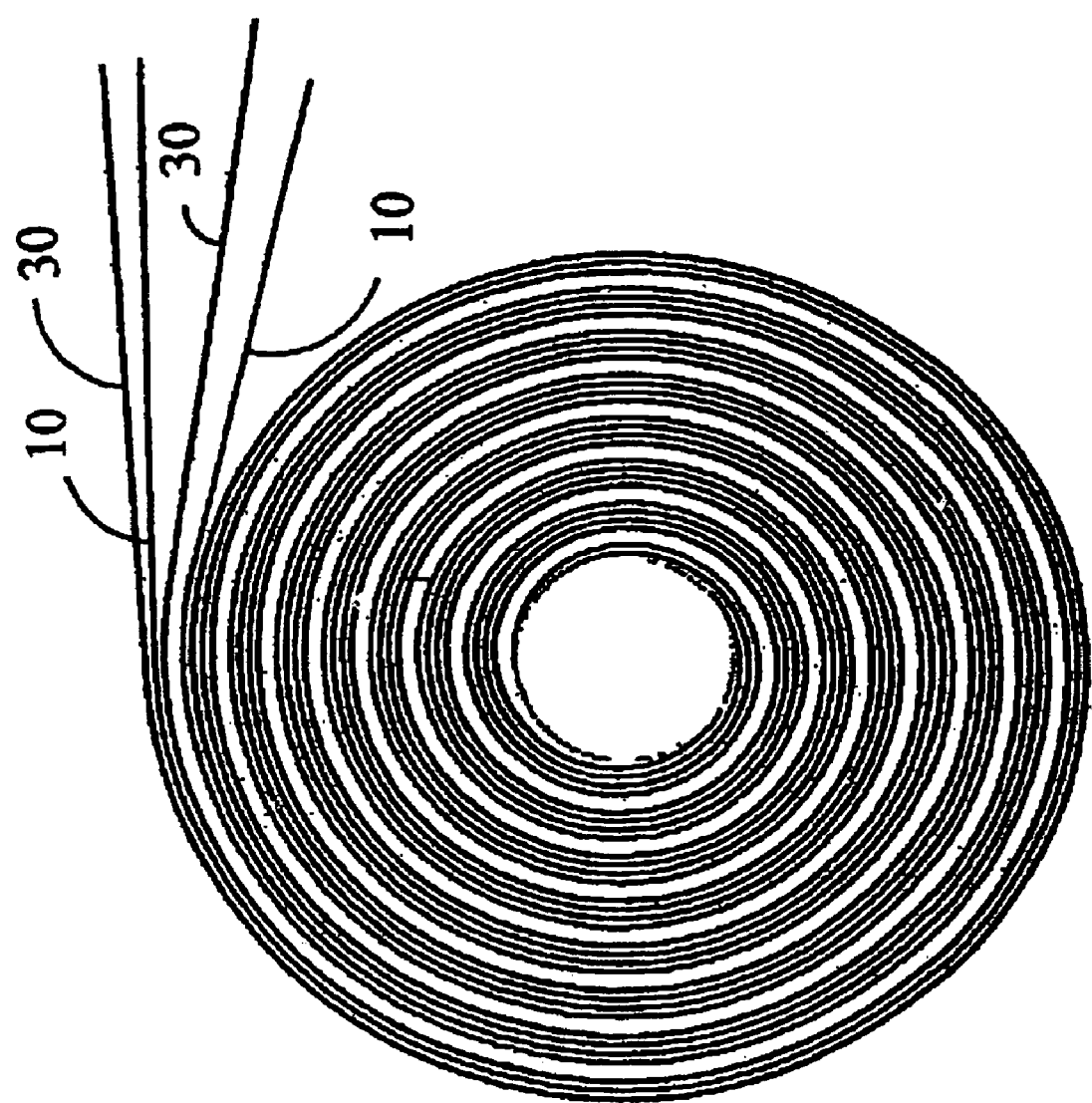
Figure 3:
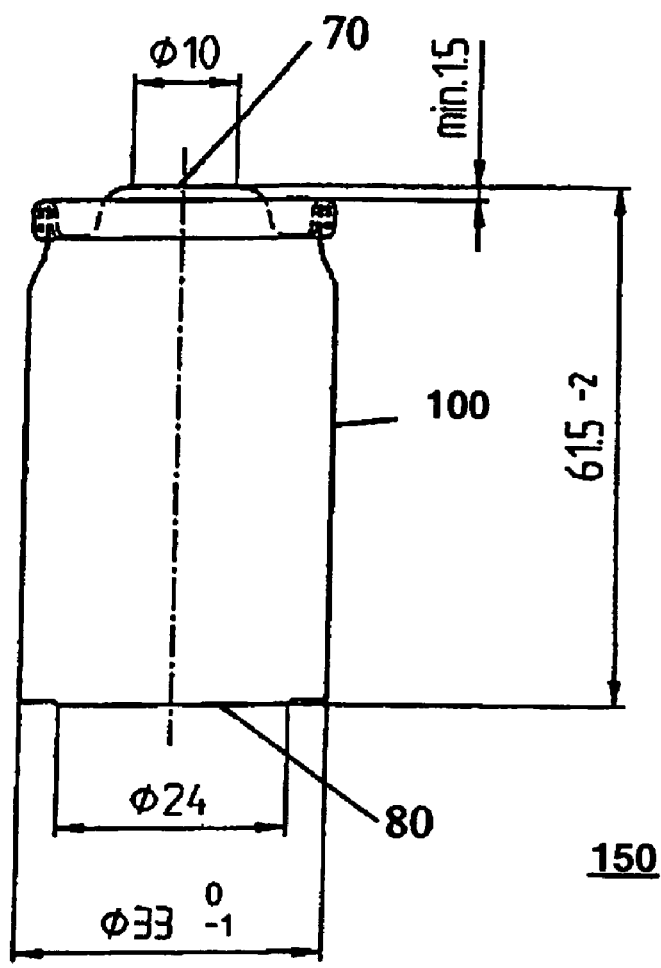
Figure 5A:
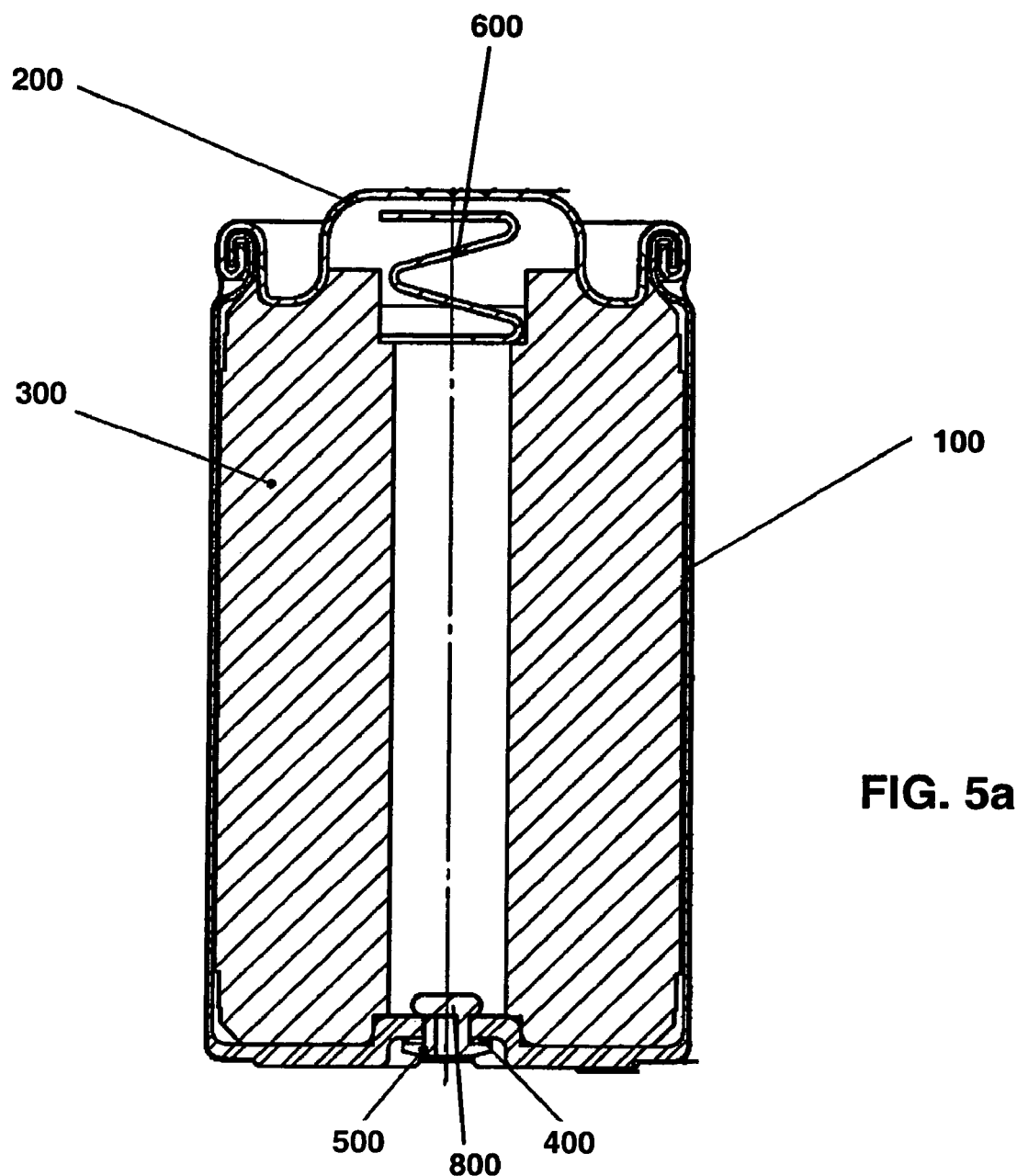
Figure 5B:
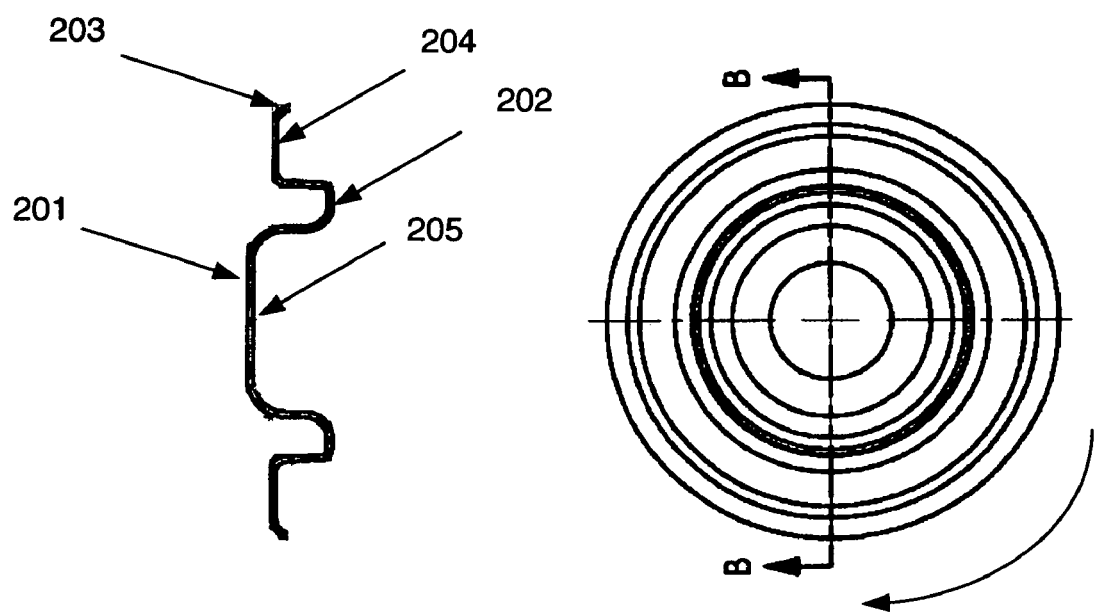
Figure 5C:
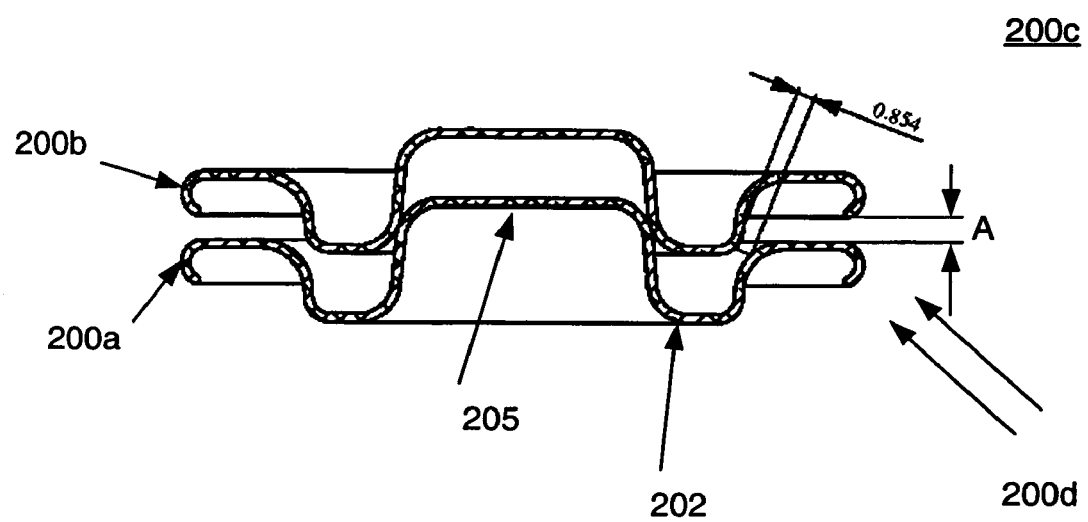
Figure 5E:
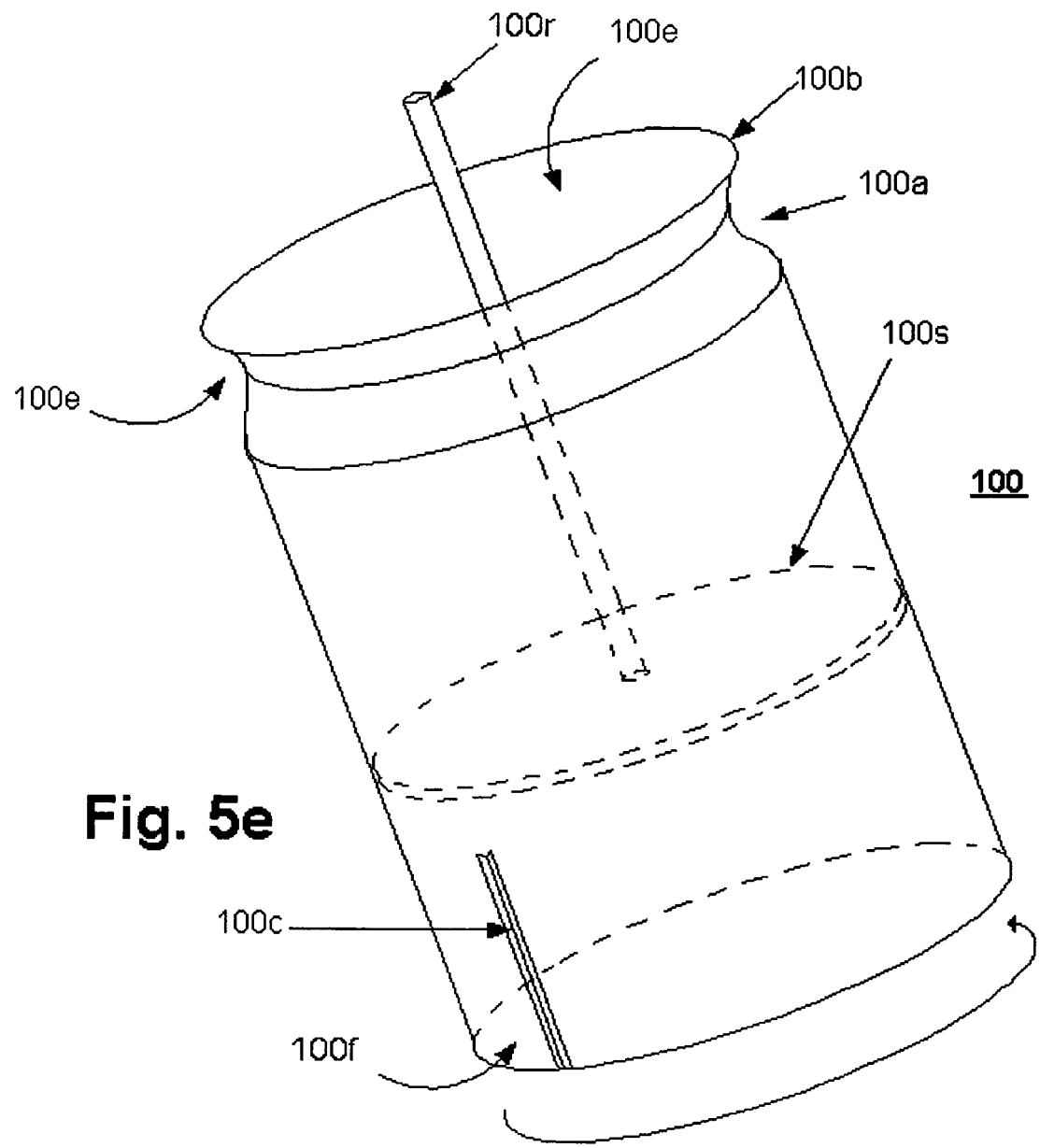
Figure 5F:
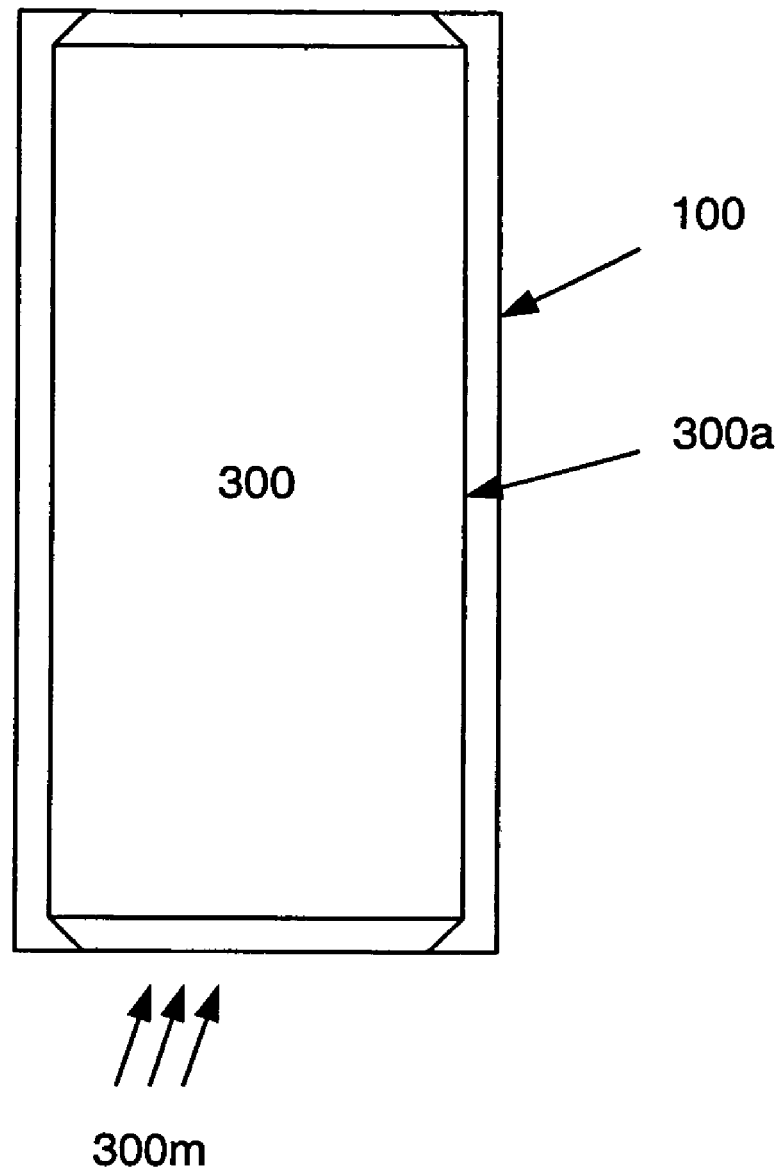
Figure 5G:
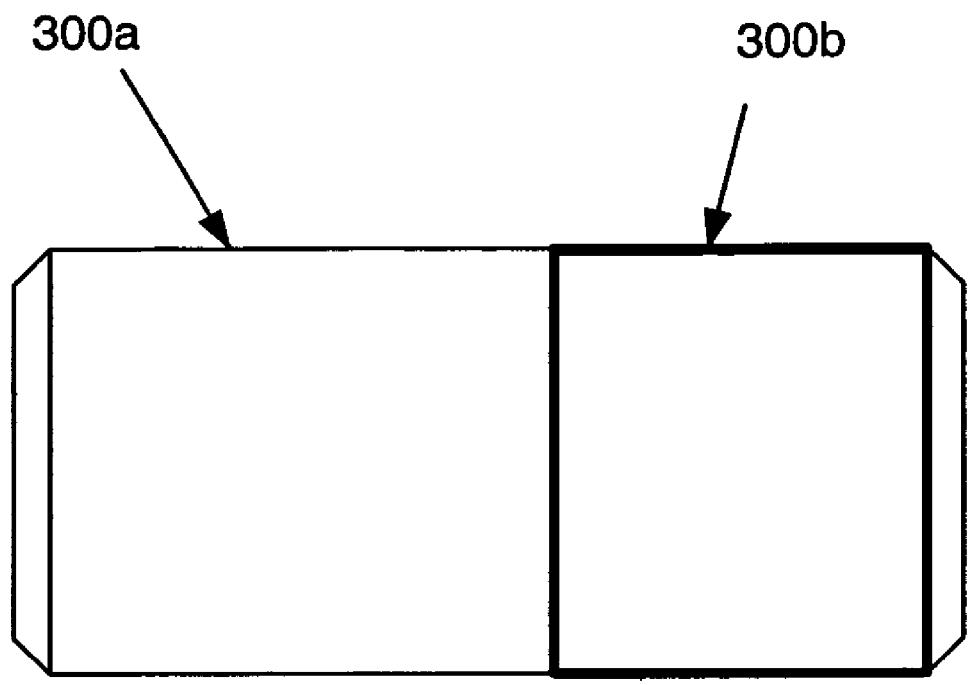
Figure 5H:
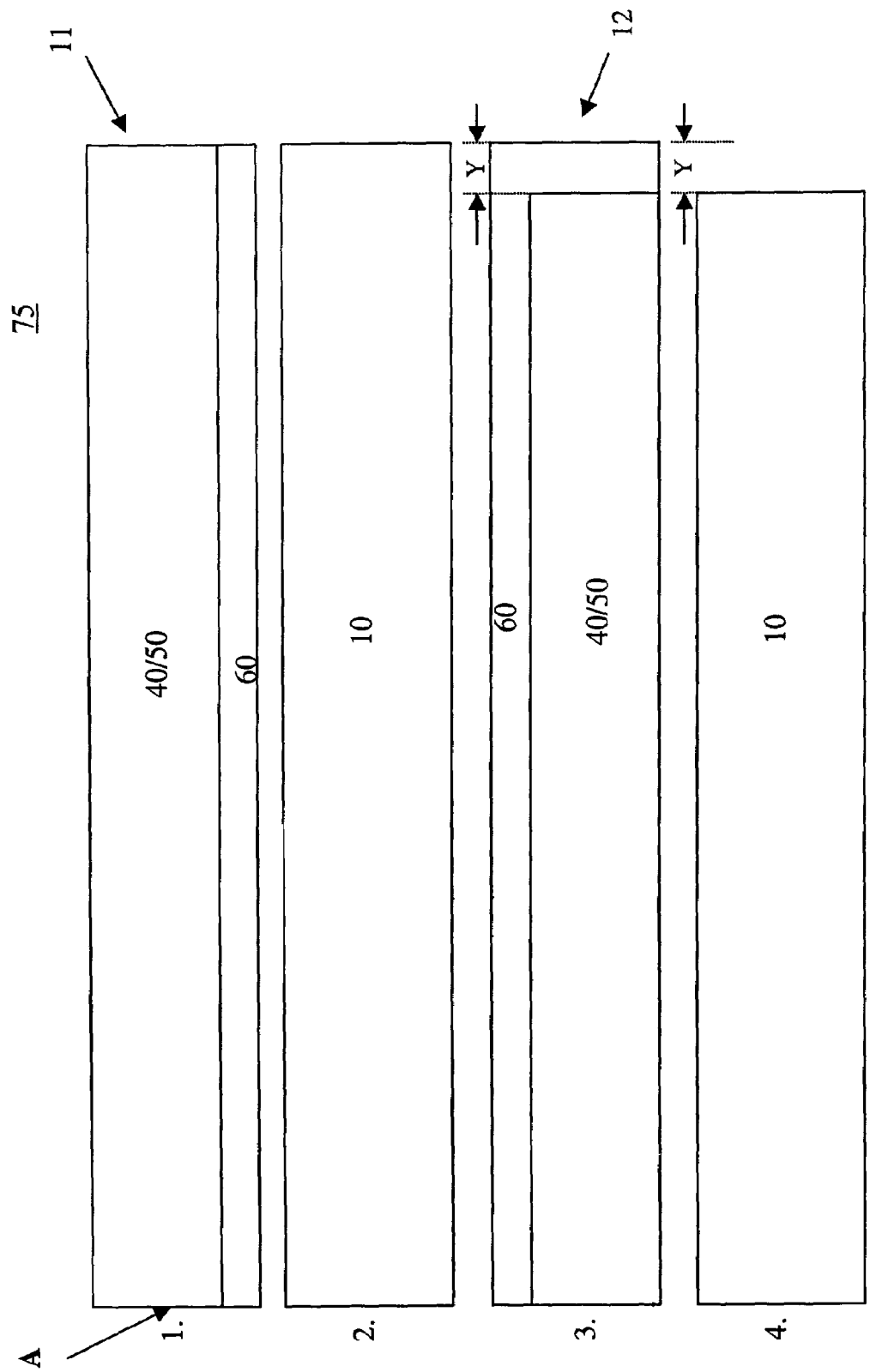
Figure 5I:
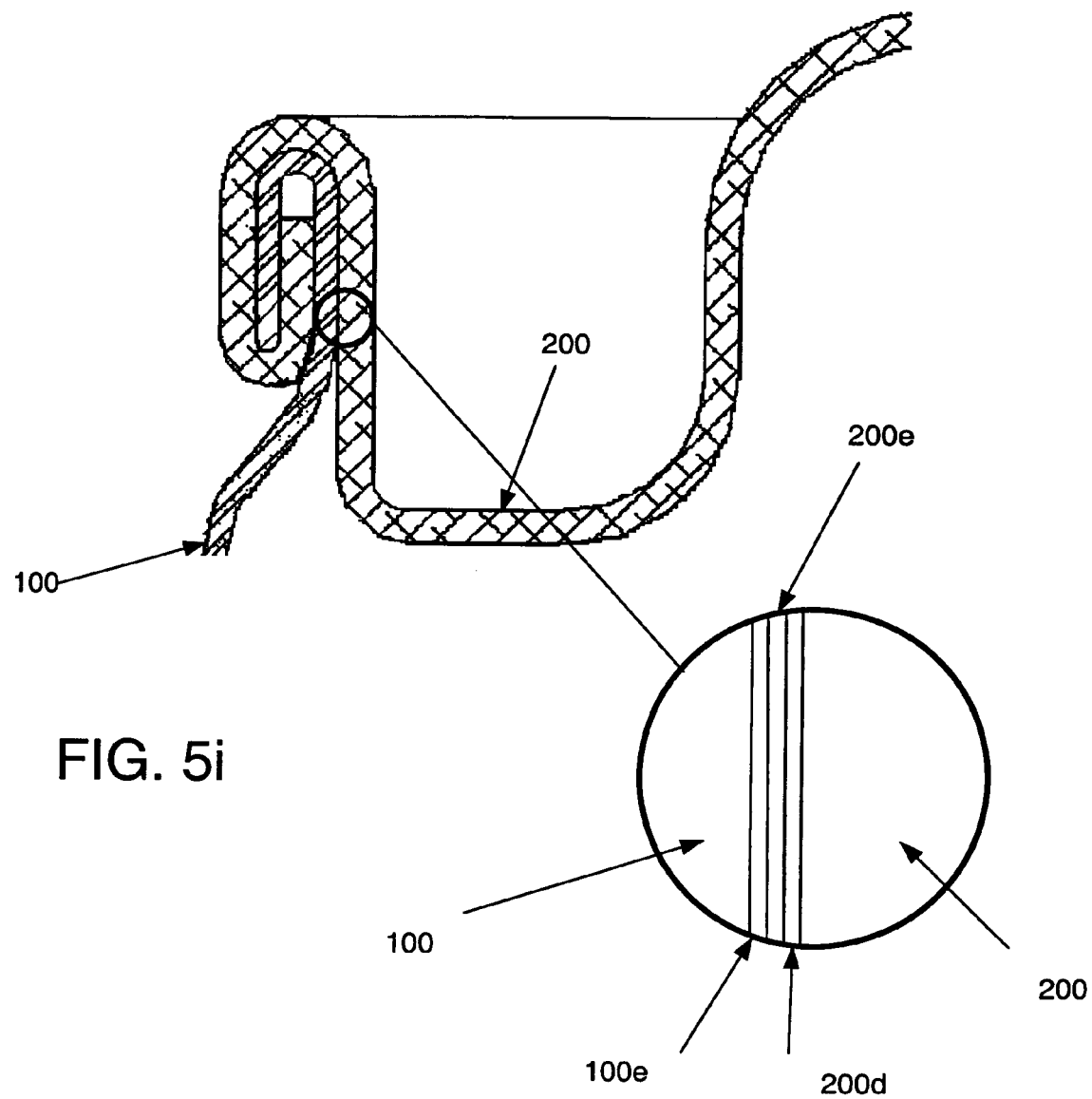

In FIG. 1 there are seen structures of a double-layer capacitor;

In FIG. 2 there is seen an end view of a jellyroll;

In FIG. 3 there is seen a battery form factor sized capacitor housing;

In FIG. 4 there is seen a perspective view of a rolled double-layer capacitor;

In FIG. 5a a rolled double-layer capacitor comprising offset collectors as discussed is shown housed in a battery form factor sized capacitor housing;

In FIG. 5b a cover is shown;

In FIG. 5c a stack of covers is shown;

In FIG. 5d a metal sheet is shown;

In FIG. 5e a housing with an inserted disk and sprayed insulator is shown;

In FIG. 5f a jelly-roll in a housing is shown;

In FIG. 5g a jelly-roll with an insulating sleeve is shown;

In FIG. 5h structures of a jelly-roll are shown with a portion of one of the structures shortened by a distance Y;

In FIG. 5i a curled cover and housing are shown; and

Figure 5J:
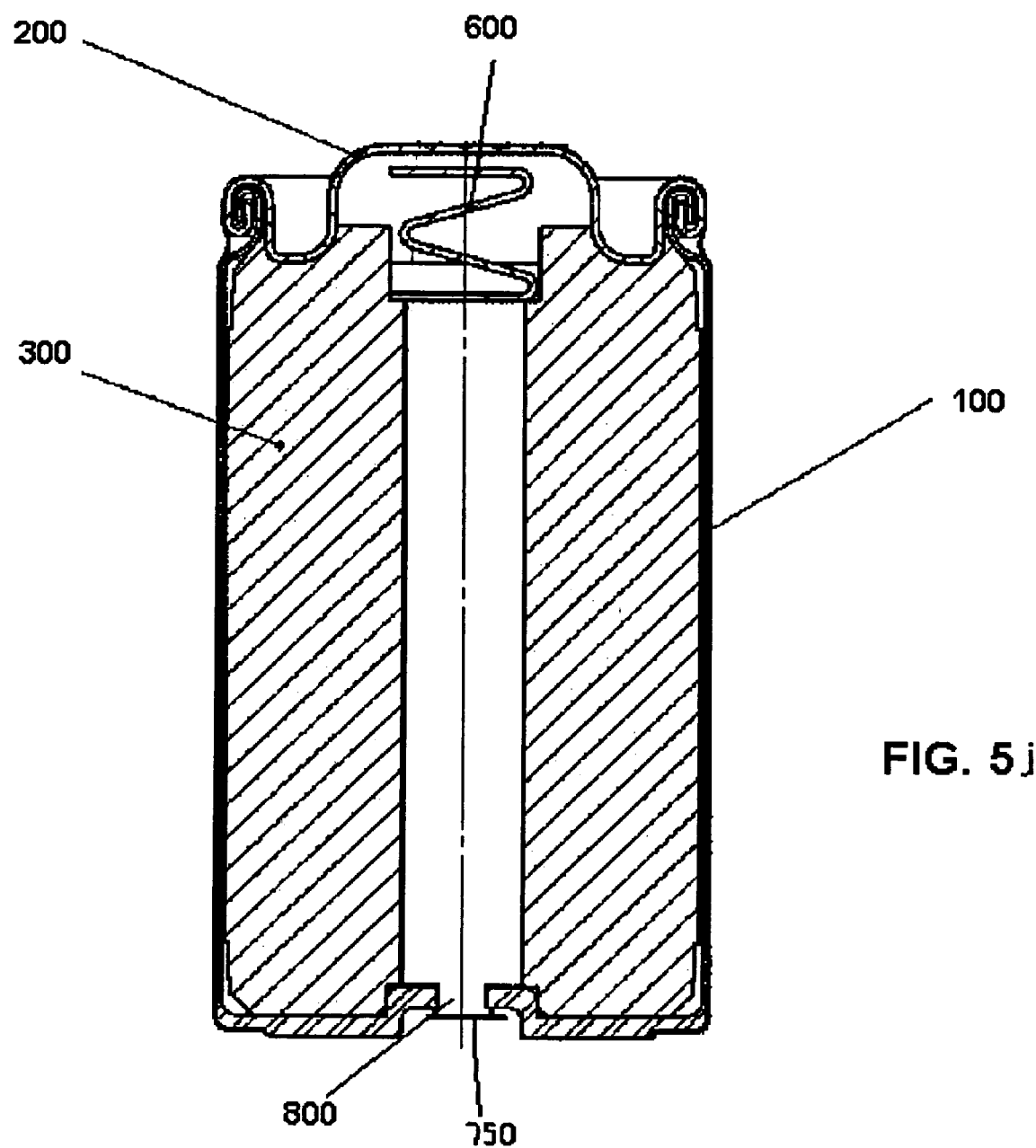

In FIG. 5j a fill hole sealed by a metal bonded ultrasonically is shown.

DESCRIPTION

Relatively recently in the energy storage field, a capacitor technology called double-layer capacitor technology, also referred to as ultra-capacitor technology and super-capacitor technology, has been developed. Double-layer capacitors store electrostatic energy in a polarized electrode/electrolyte interface layer that is created by an electrical potential formed between two electrode films when a finished capacitor cell is immersed in an electrolyte. When the electrode films and associated collecting plates are immersed in the electrolyte, a first layer of electrolyte dipole and a second layer of charged species is formed (hence, the name "double-layer" capacitor). Individual double-layer capacitor cells are available with values that include 0.1 Farad and above. For any given housing size, a double-layer capacitor cell may provide on the order of about 100-1000 times, or more, as much capacitance as a conventional capacitor cell. In one embodiment, the energy density provided by a double-layer capacitor is on the order of about 10 Wh/kg, and the power density is on the order of about 10,000 W/kg. Such double-layer capacitors can be obtained from Maxwell Technologies, Inc., located at 9244 Balboa Ave, San Diego Calif. 92123.

In one embodiment, four 2600 F|2.5 V|60 mm×172 mm|525 g| sealed capacitors are interconnected as a series string of capacitors. In one embodiment, it has been identified that when charged to 10 volts, over 1500 amps of instantaneous peak current may flow through such four series connected capacitors through their terminals. Accordingly, in one embodiment each capacitor preferably comprises terminals and interconnections that are sized to safely carry 1500 amps of peak current. Although only four series connected capacitors are discussed, the scope of the embodiments and inventions described herein envisions the interconnection of less or more than four series and/or parallel connected capacitors.

Referring now to FIG. 1 there are seen structures of a double-layer capacitor. In FIG. 1, two double-layer capacitor sheet 10 like structures are shown in a cross-section. The sheets 10 can be visualized to extend inward and outward from FIG. 1. Each sheet 10 comprises two electrode films 40 and a current collector plate 60. First surfaces of the electrode films 40 are coupled to the collector plate 60. In one embodiment, the electrode films 40 are bonded to a collector plate 60 by a respective conductive adhesive layer 50. In one embodiment, the electrode films 40 are formed from a blend of dry Teflon and dry activated and dry conductive carbon particles without use of any solvent, liquid, and the like (i.e., dry particle based) process steps. In one embodiment, the adhesive layers 50 are formed from a blend of dry conductive carbon particles and dry binder particles without use of any solvent, liquid, and the like (i.e., dry particle based) process steps. In other embodiments, the electrode films 40 and adhesive layers may be formed by other processes known to those skilled in the art, including by extrusion and/or coating. First and second sheets 10 are separated by a first separator 30. A second separator 30 is provided to comprise an outermost separator (relative to the center of jelly-roll that is subsequently formed), as is illustrated by FIG. 2. The two sheets 10 are rolled together in an offset manner that allows an exposed end of a collector plate 60 of the first sheet 10 to extend in one direction and an exposed end of a collector plate 60 of the second sheet 10 to extend in a second direction. The resulting capacitor geometry is known to those skilled in the art as a jelly-roll that is illustrated in a top view by FIG. 2. The current collector plate 60 may be treated or untreated as needed.

Double-layer capacitors have intrinsic properties that limit their maximum charging voltage to a theoretical value of no more than about 4.0 volts. In one embodiment, a nominal maximum charging voltage of a double-layer capacitor is in a range of about 2.5 to 3.0 volts, which it is identified is a voltage that encompasses the output voltage of a wide range of available rechargeable and non-rechargeable batteries. Higher and lower voltages may be available in other embodiments.

It is identified that double-layer capacitors may be designed to comprise a power density that is greater than lead acid, and many Nickel Cadmium, Lithium, and Alkaline type batteries; and with an energy density that approaches that of, or overlaps, the energy density available from lead acid, Nickel Cadmium, Lithium, and Alkaline batteries.

Referring now to FIG. 3, there is seen a battery form factor sized capacitor. In one embodiment, a double-layer capacitor is designed to conform to a battery form factor. Although an exemplary embodiment herein describes a battery form factor sized capacitor, the present invention will be understood to find applicability with other form factors, whether standardized or not. Those skilled in the art will understand that standardized battery form factor sized housings may vary within tolerances that have been established and accepted by manufacturers and those skilled in the art. The dimensions of standardized battery form factor sized housings can be obtained from international standards body IEC located at Central Office, 3, rue de Varembé, P.O. Box 131, CH-1211 GENEVA 20, Switzerland. Primary cell form factor standards known to those skilled in the art that are within the scope of the present invention are referenced in International Standard IEC Standard 60086-1-Ed. 9.0, which documents primary batteries with respect to their electrochemical system, dimensions, nomenclature, terminal configurations, markings, test methods, typical performance safety and environmental aspects, and which is incorporated herein by reference. Secondary cell form factor standards known to those skilled in the art that are within the scope of the present invention are referenced in International Standard IEC Standard 61951-1-Ed. 2.0, which documents secondary batteries with respect to their electrochemical system, dimensions, nomenclature, terminal configurations, markings, test methods, typical performance safety and environmental aspects, and which is incorporated herein by reference. Standardized battery form factor housings and terminal dimensions and configurations can also be obtained from American National Standards Institute (ANSI) located at Washington, D.C. Headquarters 1819 L Street, NW (between 18th and 19th Streets), 6th floor Washington, D.C. 20036. ANSI standards for batteries are known by those skilled in the art as ANSI/NEDA standards. For example, an ANSI standard for D-cell sized battery housings is known as ANSI/NEDA 13A, an ANSI standard for C-cell sized battery housings is known as ANSI/NEDA 14A, an ANSI standard for AA-cell sized battery housings is known as ANSI/NEDA 15A, an ANSI standard for D-cell sized battery housings is known as ANSI/NEDA 24A, and an ANSI standard for 9 volt sized battery housings is known as ANSI/NEDA 1604A.

In one embodiment, a battery form factor sized housing manufactured as an Energizer™ brand D-cell sized battery comprises a diameter of about 32.3-34.2 mm and a height of about 59.5-61.5 mm. Accordingly, in one embodiment, a battery form factor sized capacitor housing 100 comprises a diameter of about 33 +0/−1 mm and a height of about 61.5 +0/−2 mm, which are dimensions that are within the ANSI/NEDA and IEC dimensions for D-cell sized battery housings, and Energizer brand battery D-cell dimensions. It is understood that, D-cell dimensions are illustrative of one possible standardized battery form factor sized housing that is within the scope of the present invention, which should be limited only by the scope of the claims. For example, a C-cell form factor sized capacitor housing can comprise a diameter of about 25.2+0/−1 mm and a height of about 49.0 +0/−2 mm, an AA-cell form factor sized capacitor housing can comprise a diameter of about 13.0 +0/−1 mm and a height of about 50.0 +0/−2 mm, and a AAA-cell form factor sized capacitor housing can comprise a diameter of about 10.0+0/−1 mm and a height of 44.0 +0/−2 mm. In one embodiment, a double-layer capacitor in a D-cell form factor sized capacitor housing 100 has been demonstrated to provide 425 F, 3.2 mOhm at about 2.5 Vdc in a 56 g cell and an energy density of about 6.5 Wh/kg and a power density of about 8.7 kW/kg.

In one embodiment, a capacitor housing 100 may be provided with external electrode connections/connectors/terminals 70, 80 similar to, or the same as, those of standardized batteries. Inclusion of battery style terminal ends on a capacitor housing 100 enables that the housing can be provided to easily connect to apparatus that utilize battery style connections of a reverse sex. Because existing standardized battery style connectors, and modules that use them, can be readily obtained from manufacturers, redesign time and costs can be appreciably reduced when implementing one or more of the embodiments described herein.

Standardized battery style connections/connectors/terminals 70, 80 can also be used to connect multiple capacitor housings 100 together. For example, as with batteries, the operating voltage of a double-layer capacitor 150 may be increased by connecting two or more double-layer capacitors in series. The use of standardized battery style connections/connectors/terminals 70, 80 facilitates such series connections.

As well, standardized battery style connections/connectors/terminals 70, 80 can be used to facilitate parallel connections. Battery style connections 70, 80 allow easy drop in capacitor replacement of batteries to be made. The benefits and advantages of the embodiments described herein enable easy connection and replacement of battery technology with double-layer capacitor technology, and, thus, increase the number of potential applications that double-layer capacitors can be used in. Furthermore, a change of energy component type, from battery to double-layer capacitor, finds interest in applications where maintenance cost is a key factor, or where cyclability is important.

In one embodiment, it is identified that the ends 70, 80 of a battery form factor sized capacitor housing 100 lend themselves well to a geometrical design that exhibits a relatively large electrically conductive surface area, as compared to conventional capacitor housings that provide small diameter leads, terminals, etc. For example, in one embodiment, a D-cell battery form factor sized capacitor housing 100 may be designed to comprise conductive end surface area(s) of greater than 90 m$^2$. The large electrical contact surface area at the ends of a D-cell form factor sized capacitor housing 100 allows that high current may flow through the end with minimal electrical loss. Because double-layer capacitors can supply or receive higher current than comparable batteries, the large surface area ends 70, 80 can be used advantageously for this purpose. Large surface area ends 70, 80 also allow that the ends may be provided in many geometrical variations and yet remain within the required dimensions of a particular battery form factor. For example, appropriate dimensioning of the ends 70, 80 may be made to provide large screw-in type connections, mechanical pressure type connections, welding/solder type connections, as well as others that in the capacitor prior art would not be practical or not possible.

Double-layer technology is now capable of being provided with energy and/or power density performance characteristics that approach or exceed those of batteries. Accordingly, it has been identified that double-layer capacitor technology can housed in a standardized battery form factor sized housing to supplement, or substitute for, equivalent sized batteries. Double-layer capacitor technology in a battery form factor sized housing 100 may also improve upon battery technology. For example, a D-cell sized double-layer capacitor 150 can provide many more charge/recharge cycles than may achieved by a D-cell sized rechargeable battery. Because double-layer capacitors utilize an electrostatic storage mechanism, they can be cycled through hundreds of thousands of charges and discharges without performance degradation, which compares with life cycles of less than 1000 for rechargeable batteries.

Although discussed with reference to a D-cell form factor sized housing 100, the present invention is not limited to a D-cell form factor housing and/or standardized battery electrode connections/connectors/terminals 70, 80. For example, one or more of the above identified principles and advantages can be used to effectuate other battery form factor sized capacitor housings and connectors. For example, it is identified that many power tools are now powered by batteries in a power tool specific form factor housing. In one embodiment, double-layer capacitor(s) are housed in such a manufacturer specific housing. Although some double-layer capacitors may not have the energy density of batteries, they do typically have more power density than batteries and, thus, can be used as a short-term substitute for a power tool battery pack. Because a double-layer capacitor based energy source in a battery form factor sized capacitor housing can be recharged more quickly than a battery, for example, on the order of 15 seconds or so, as opposed to the tens of minutes for a battery, double-layer capacitor technology can be utilized as a battery substitute or supplement when re/charge times are critical.

Referring now to FIG. 4, there is seen a perspective view of a jelly-roll type double-layer capacitor. In one embodiment, ends of one offset collector extend from one end 1212 of a rolled double-layer capacitor 1200, and ends of another offset collector extend (represented by exemplary collector extensions 1202) from another end 1206. In one embodiment, the capacitor is rolled about a centrally disposed rod, which after rolling may be removed to thus leave a centrally disposed void within the jelly-roll.

Referring to FIG. 5a, and preceding Figures as needed, in one embodiment a D-cell form factor double-layer capacitor comprises a housing 100, a cover 200, and a jelly-roll electrode 300. In one embodiment, the housing comprises aluminum, and the cover 200 comprises aluminum.

With reference to FIG. 5b, and preceding Figures as needed, the cover 200 may be extruded, shaped, machined, molded, and/or stamped to conform or comprise the general shape of one end of a D-cell battery. As seen in FIG. 5b, in its unassembled form, the cover 200 comprises a circular geometry with an upper 201 and lower 202 surface and a curved outer periphery 203. The lower surface 202 at the outer periphery is later coupled to the housing 100 during a process that forms a seal between the cover 200 and the housing 100.

An assembled double-layer capacitor comprises a positive and a negative polarity. To electrically separate such polarity, an electrical insulator or insulation may be provided, for example, as between a cover 200 and a housing 100. As is identified later, preferably, a sealing material may also be provided between the cover 200 and the housing 100.

In one embodiment, the electrical insulator is applied to the cover 200. In embodiments, it is identified that the insulator may be applied to the cover 200 by applying the insulator by dipping or spraying of the cover. In one embodiment, an insulator in the form of a liquid 204 is deposited onto the cover 200 such that the insulator becomes distributed across a surface of the cover by rotative spreading forces that are transferred to liquid by the cover, while the cover is rotated about its center. In one embodiment, when applied from above a spinning cover 200 in an orientation of the cover that allows deposition of the liquid 204 onto the lower surface 202, an upwardly curved portion of the outer periphery 203 acts to constrain spreading of the liquid 204 to within the periphery. Spinning of the cover 200 to evenly distribute materials onto a bare cover or a previously coated cover, can be extended to other materials, for example, sealants, which are discussed further below.

In one embodiment, it is identified that electrical connection needs to be made between the cover 200 and the jellyroll 300, and for this reason, a portion of the surface 202 to which insulator has been applied is preferably left bare of insulator. In one embodiment, a central portion 205 of the surface 202 is left bare.

It is identified that when a material is required to be applied to only a portion of a cover 200, the bare portion of the cover is typically masked from the material. Such masking, as well as application of material, is time consuming in that it requires individual handling of each cover.

The present invention has identified a novel and new way to apply a material to a cover 200 that does not require individual handling of each cover during application of the material. The present invention allows multiple covers 200 to be processed in a batch mode, wherein before and after processing, the covers can be maintained in a configuration that facilitates application of the material, while at the same time masking a center portion of a cover. In one embodiment, the material is the insulator discussed above.

Referring to FIG. 5c; and preceding Figures as needed, after a cover 200a is manufactured, it is stacked on top of a previously manufactured bare cover 200b. This process of stacking can continue within limits that are determined by the ability to handle such a stack efficiently. It is identified that once a stack 200c of covers is formed, the stack can be moved in batch mode to effectuate batch processing of the covers. For example, in one embodiment, a stack 200c of 30 covers can be moved from one area of manufacture to another without having to separately handle each cover.

It is identified that an insulator 200d can be applied to individual covers comprising a stack 200c without requiring that the stack be dissembled. Although such a stack 200c of covers could be coated with an insulator 200d using a spray technique, wherein the insulator could be applied to the stack in it entirety, it has been identified that because the vertical spacing "A" between each stacked cover is relatively small, for example, on the order of 1/16 of an inch, the insulator 200d typically cannot adequately penetrate within the spaces between the stack 200c.

It is identified, however, that application of the insulator 200d to a stack 200c of covers by a process known to those skilled in the art as "cataphoresis" can provide an even smooth consistent insulator 200d thickness across the surfaces of the cover. Cataphoresis is a process known to those skilled in the art whereby a material (for example, insulator 200d) can be evenly deposited on a surface by the application or opposite electrical charges to the material and the item to be deposited on (for example, cover 200). Numerous investigations by the present inventors have identified that COLORAL® is presently best suited for application by catophoresis and as well as for use in a double-layer capacitor product. COLORAL® is available from VISTA nv, Nordring 4, 45894 Gelsenkirchen, Germany.

In one embodiment, it is desired that the insulator 200d be deposited evenly and consistently on both upper 201 and lower 202 surfaces at the outer radius of the cover 200, but not at the inner radius of the cover. It is identified that application of the insulator 200d by cataphoresis to a stack 200c of covers effectuates that insulator 200d is not deposited at the inner radius of the cover 200. In other-words, when two or more covers 200 are stacked, by virtue of their geometry, the top cover may act to mask the cover beneath it from an externally applied insulator. Because in a stack 200c the central portion 205 a bottom cover may be blocked by an adjacent top cover, the central portion 205 of the bottom cover may be masked without any user intervention required. During a subsequent step of application of insulator 200d, by cataphoresis or otherwise, the inner radius of each cover (except possibly the top cover) is kept free of insulator 200d by the central portion 205 of an adjacent cover. After application of the insulator to the stack 200c of covers, the covers can be moved in a batch mode to subsequent process steps, where the covers can be individually separated from the stack as needed.

In a subsequent step, a separated cover 200 with insulator 200d applied is coated with a sealant 200e. The sealant 200e provides flexibility and hermeticity, such that when the cover 200 is used to seal a housing 100, the sealed capacitor product thus formed is may be free of leakage of electrolyte. In one embodiment, the sealant 200e is preferably selected from sealant available as DAREX from W. R. Grace S. A. 33, Route de Gallardon, B P 39 Epernon-Cedex, F-28234 France. The sealant is preferably applied such that an even smooth consistent layer of the sealant 200e is formed over the insulator 200d. In one embodiment, the sealant 200e is applied as a liquid 204 to the outer radial periphery of a spinning cover 200, whereby rotative forces of the cover evenly distribute the liquid over the outer radius of the cover. By appropriate initial placement of the liquid 204 and an appropriate rotative speed, an even smooth consistent layer can be formed and distributed such that an inner radius of the cover 200 remains bare of the sealant 200e. The cover may be subsequently heat treated before further handling.

Referring to FIG. 5d, and preceding Figures as needed, in a subsequent step, a semi rigid electrically conductive metal 600 is connected to a bare central portion 205 of the bottom surface 202 of a cover 200. In one embodiment, the metal 600 is formed of a 0.6 mm thick flat sheet of aluminum. The metal 600 is of sufficient cross-sectional area to be able to pass 1500 amps of current without damage to the metal 600 or the connections made to couple the metal to the cover and jellyroll. The metal is formed into a geometry that comprises a first end 600a, a second end 600b, and a central portion 600c. In one embodiment, at the second end 600b, the metal comprises a portion that extends generally perpendicular to an axis formed through the first portion 600 and the central portion 600c. In one embodiment, the second end 600b, comprises a centrally disposed void 600d. The void may comprise a slot, a hole, or other opening. In one embodiment, before attachment to a cover 200, the metal 600 may be pre/bent at the central portion 600c twice such that when viewed in a cross-section the metal comprises a shape similar to that of an "M". In this "M" configuration, the first end 600a is attached to a central portion 205 of a cover 200. Attachment is preferably made by welding, for example, by a spot weld or a laser weld. After attachment of the metal 600 to a cover 200, the cover may be placed aside until needed, as will be described further below. In other embodiments, in applications where needed, it is identified that the portions of metal 600 may be bent 3 or more times and still fall within the scope of the present invention.

Referring to FIG. 5e, and preceding Figures as needed, in a subsequent step, a housing 100 is obtained. Preferably the housing 100 is formed to comprise at its open end an inwardly curved neck portion 100a and an outwardly directed lip portion 100b. This geometry effectuates sealing between a cover 200 and the housing 100 during a subsequent curling/sealing step. Other geometries are also within the scope of the invention. In one embodiment, forming (for example, necking, sealing) etc. may be effectuated after insertion of a jellyroll 300 within the housing, with implementation of such processes known to those skilled in the art. In one embodiment, the housing 100 may be subject to application of a stamping or other forming force during manufacture of the housing, which forms a longitudinal indentation 100c into the housing. It is identified that the indentation 100c may be used to weaken the housing to an extent that allows the indentation to slowly crack or open under a specific pressure. The ability to slowly crack or open protects a sealed capacitor product from exploding catastrophically during some of its failure modes. In other words, the indentation 100c can provide functionality similar to that of a "fuse," wherein at a certain pressure, the indentation safely renders the capacitor to be non functional. The exterior and interior of the housing 100 are cleaned using techniques known to those skilled in the art.

In a subsequent step, an electrical insulator 100e is applied to the exterior and the interior of the housing 100. In one embodiment, the insulator 100e is applied to the housing while the can is subject to spinning about a central longitudinal axis. In one embodiment, the insulator 100e is applied by spraying the insulator. In one embodiment, the insulator 100e is a PAM polyamide coating, known to those skilled in the art. In one embodiment, the insulator 100e is applied to only a portion of the exterior and the interior of the housing 100. For example, it is identified that the interior and exterior of the housing 100 may need be coated to an extent needed to effectuate subsequent sealing of the housing 100 by a cover

200. In other words, electrical insulation may need be applied only to a portion of the exterior of the housing 100 that would otherwise make electrical contact to a bare cover 200. In one embodiment, the portion of the interior and exterior of the housing 100 that is covered with electrical insulation 100e is an upper portion of the housing.

The upper portion of the interior of the housing 100 may be covered with an insulator for the same reason that the upper portion of the exterior of the housing is covered, for electrical insulation between surfaces of the upper portion and a subsequently applied cover 200. It is identified however, that application of an insulator to the remaining portion of the interior of the housing 100 may also be needed. Before providing further description of the application of insulator 100e to the interior portion of the housing 100, a more detailed description of jelly-roll 300 is provided.

Referring to FIG. 5f, and preceding Figures as needed, in one embodiment, a jelly-roll 300 comprising offset collectors is positioned within an open end of a housing 100. It is identified in an embodiment wherein the housing 100 is provided with one polarity and the cover is provided with the opposite polarity, an orientation of the jelly-roll 300 within the housing 100 can affect performance of a final capacitor product. For example, when an extending collector associated with the outermost electrode layer 300a is coupled to the positive polarity of the cover 200 (i.e. "flipped" jelly-roll orientation), the positive polarity of the cover can become electrically shorted by the outermost electrode layer to the negative polarity of the housing. Although, in one embodiment jelly-roll 300 may be physically separated from the housing 100 by an outermost paper separator 30 (FIG. 1d), because paper separator 30 is porous, it does not act to fully electrically separate the jelly-roll from the housing when subsequently impregnated with conductive electrolyte. As well, use of paper separator 30 may act to thermally isolate the jelly-roll 300 from the housing 100, which may act to limit thermal dissipation of heat generated by the jelly-roll 300 by the housing, which may as a consequence reduce the lifetime of the jelly-roll.

Referring to FIG. 5g, and preceding Figures as needed, in a "flipped" jelly-roll orientation, to provide electrical insulation from a housing 100, an additional outermost sleeve of thin plastic or other insulative material 300b may be applied to a jelly-roll 300. However, it is identified that use of such an outermost insulative material 300b may entail extra cost, both in material, and time.

Referring again to FIG. 5e, in one embodiment, electrical insulator 100e may be applied from a top portion of the walls of interior of the housing 100 to a bottom portion. In one embodiment, the electrical insulator is applied as a fixed spray during a time the housing is rotated. As described previously, a preferred insulator 100e for use as a sprayed coating has been found to be PAM polyamide. Such coating can be applied as a natural extension of coating the upper outer and upper inner portions of the housing 100. As a result, in an embodiment wherein a jelly-roll is inserted in a flipped orientation, as well as in a flipped orientation, when an insulator 100e is applied to the interior walls of the housing, an insulating material 300b may not need to be used.

It is identified, however, that during application of the insulator 100e to the inner walls of the housing 100, a certain amount of insulator may become deposited at the inner bottom end 100f of the housing, for example, by overspray or by diffusion. It has been identified that such deposition at the inner bottom end 100f can negatively impact a subsequent electrical connection step that is made between the collectors of the jellyroll 300 to the bottom inner end of the housing 100.

In one embodiment, after a step of insertion of a jellyroll 300 within the housing 100, the collectors at one end of the jelly-roll are electrically coupled to the housing by welding. During welding, it is desirable to press down onto the jelly-roll 300 so as to have a more extensive contact and interface between the collectors and the housing 100. In a preferred embodiment, welding is effectuated in a laser welding step, wherein a beam of laser light 300m (FIG. 5f) is applied in a particular pattern to the exterior bottom end of the housing 100. Preferably, the beam of laser light is of sufficient intensity to heat the housing 100 and the collectors of the jelly-roll 300 so as to physically and electrically bond the collectors to the housing 100 without damaging the housing or the jelly-roll.

It has been identified that any impurities, dirt, residue, and/or over spray present at the inner bottom end 100f can act to interfere with the welding process. For example, it is identified that overspray from application of the insulator 100e to the interior walls of the housing 100 can occur and be deposited on inner bottom end 100f of the housing. Such overspray can interact with the externally applied laser beam by acting to locally increase the temperature at the point of application of the laser light 300m. Such increased temperature can act to burn through the bottom end of the housing 100 and/or damage the housing and/or jellyroll 300. Additionally, such increased temperature can act to interact with the insulator 100e to release or create impurities that can subsequently affect operation of the jelly-roll 300. Accordingly, it is preferred that when the interior of the housing 100 is provided with an insulator 100e, the inner bottom end 100f of the housing is kept free of any dirt, impurities, residue, including free of the insulator.

With reference to FIG. 5e, and preceding Figures as needed, in one embodiment, during application of insulator 100e within the housing 100, a disk 100s is provided within the housing. In one embodiment, a diameter of the disk 100s is made to be slightly smaller than the interior diameter of the housing. In a step of spraying insulator 100e in the interior of the housing 100e, the disk 100s is inserted within the housing, at which time during spinning rotation of the housing and application of insulator 100e, a pressure greater than that above the disk is applied below the disk. In one embodiment, the pressure may be applied via a hollow rod 100r that may also be used to center the disk 100s within the housing. With a relative positive pressure created within the housing 100 below the disk 100s, any sprayed insulator 100e applied above the disk 100s may be prevented from migrating or diffusing to below the disk. In this manner, the interior walls of the housing 100 can be selectively and evenly coated with insulator 100e, and the inner bottom end 100f can be kept free of the insulator.

In other embodiments, it is identified disk 100s can be used to controllably apply an insulator 100e or other material to the interior of a housing such that the material extends to other than the full length from top to bottom of the interior walls of the housing. Such selective and controllable application of material to the interior walls of the housing 100 can be used in other embodiments. For example, in one embodiment, it may be desired to provide an insulating sleeve 300b (FIG. 5g) about only a short bottom portion of a jelly-roll 300, in which case only an upper portion of the interior walls of the housing 100 would need to be coated with an insulator. After insulator 100e is applied to the interior of the housing 100, the insulator may be dried under appropriate temperature, and a jelly-roll 100 is inserted within the housing (FIG. 5f). Prior to insertion within the housing 100, the extending collectors of the jelly-roll 300 at both ends may be bent over such that coextensive surface contact between the collectors can be achieved and such that better electrical and welded contact can subsequently be made thereto.

In one embodiment, wherein an extending collector associated with an outermost electrode layer 300a is coupled to the housing 100 (an "unflipped" jelly-roll orientation), and wherein direct electrical contact between an outermost electrode layer and the housing 100 may be desired to reduce electrical resistance between the housing and the outermost collector of the outermost electrode layer, it is understood that the above described insulator 100e would need to be applied only to the upper inner portion of the housing 100 that is used for subsequent sealing. However, as discussed previously, an outermost paper separator 30 may act to degrade thermal dissipation, and as well, conductivity between the outermost electrode layer 300a and the housing 100. Thus, in some embodiments, it is identified that outermost electrode layer 300a of a jelly-roll 300 may provide limited or no functionality. In such case, the materials (separator, carbon, binder, etc.) used to form the outermost electrode layer 300a may be considered to take up a volume of the capacitor that could otherwise be used to increase performance of a capacitor.

To this end, it is identified that in an "unflipped" jelly-roll 300 orientation, it may be preferred during or after manufacture of capacitor sheets 10 (FIG. 1c) to remove a portion of the electrode film 40 and, if used, adhesive layer 50, from the sheet 10 corresponding to the outermost electrode layer 300a.

Referring to FIG. 5h, and preceding Figures as needed, there is seen two capacitor sheets 11, 12, wherein in an unrolled configuration, electrode sheets 11, 12 of a jelly roll 75 each comprise an electrode film 40, adhesive layer 50, and a collector plate 60. Electrode sheet 12 differs from that of electrode sheet 11 in that coextensive contact of the electrode film 40 and adhesive layer 50 with one side of collector plate 60 differs by a distance "Y". In one embodiment, the distance "Y" corresponds to about the same distance as the outer exposed surface at a circumference of a jelly-roll that is subsequently formed from electrode sheets 11, 12, and separators 10. In one embodiment, the paper separator 10 that is oriented to be the outermost separator of a jelly-roll may as well be reduced in length by a distance "Y". In one embodiment, the ends of the separators 10, and electrode sheets 11, 12, may be overlaid at ends, and subsequently may be rolled into a jelly-roll 75. It is identified that in doing so, a jelly-roll 75 may thus be formed to comprise an outermost electrode layer 12 that exposes only a bare collector plate 60 portion ("Y" distance) along the outer circumferential surface of the jelly-roll, which could then be used to make direct electrical contact to a housing 100 of same polarity. In one embodiment, the "Y" distance of electrode film 40 and/or adhesive layer 50 may be removed from the outermost electrode layer 12 after winding of the jelly-roll. In such embodiments, in which electrical contact is desired to be made to the outermost electrode layer 12, it is identified that the inner walls of a housing 100 would not require application of an insulator.

In one embodiment, prior to insertion within the housing 100, the end of the jelly-roll 300 that would extend from the open end of the housing is attached to the bottom end 600b of the conductive metal 600 (FIG. 5d). In one embodiment, the bottom end 600b is attached to the jelly-roll 300 by application of laser beam during a time the bottom is maintained in centralized contact with the end of the jelly-roll. The laser beam is preferably of a magnitude that during welding of the bottom end 600b to the jelly-roll 300, the jelly-roll does not become damaged, but of sufficient magnitude that a solid connection is made to the collectors of the jelly-roll.

Referring to FIG. 5i, in one embodiment, the jelly-roll 300, is sealed within the housing 100 by placing the cover 200 onto the housing, and by application of a force to the cover 200 and the upper portions 100a-b of the housing (FIG. 5e) to mechanically curl the cover and upper portion at the same time and in a manner that the sealant 200e previously applied to the cover creates a hermetic seal against release and influx of gases, liquids, impurities, etc. and, as well, such that the insulator 100e and 200d previously applied to the housing and cover acts to electrically insulate the cover from the housing.

It is identified that during the step of applying the cover 200 to the housing 100, the metal 600 (FIG. 5a) will become further folded at the previously bended portions, and that when the cover is fully sealed against the housing, a spring action of the bent metal may act to apply a downward force onto the jelly-roll 300. This spring action may help to make better contact between the jelly-roll 300 and the housing 100 in an embodiment wherein the bottom end of jelly-roll is laser welded to the bottom end of the housing after the housing is sealed by a cover 200.

In one embodiment, after a housing 100 is sealed by a cover 200, the resulting capacitor product may be impregnated with electrolyte by introduction of the electrolyte through a sealable fill port 800. In one embodiment, after introduction of electrolyte, a rivet 500 is inserted into the fill port. The rivet 500 is used to compress an o-ring 400 against the housing 100, after which the capacitor product in its sealed form may be provided for use. It has been identified, however, that after a rivet 500 is used to seal a capacitor, a portion of the rivet may remain and extend within the housing 100. Such extending portion of a rivet 500 may act to physically damage a jelly-roll 300. For this reason, when a rivet 500 is used, the jelly-roll 300 geometry needs to be such that it can accommodate use of the rivet. One method of accommodating a rivet 500 has been to make sure that a void corresponding to placement of the rivet is provided in the jelly-roll. As discussed previously, a jelly-roll 300 can be provided with an axially located void during it formation, which can be subsequently used to accommodate the extending portion of a rivet 500 that is centrally located at the bottom of a housing 100. It is desired, however, that the size of the void in the jelly-roll 300 be kept to a minimum, in which case tolerance variations from one jelly-roll to another jelly-roll may cause subsequently used rivets to sometimes touch or damage the jelly-rolls.

In one embodiment, a rivet 500 and o-ring 400 are not used to seal a fill hole 800, for example, as described by FIG. 5j. By not using a rivet 500 or o-ring 400, a concomitant process step can be simplified. As well, chemical interactions between the rivet and o-ring that may occur may be eliminated, thereby increasing the performance and lifetime of the capacitor. Also, damage to the jelly-roll from a rivet 500 can be eliminated.

Referring to FIG. 5j, and preceding Figures as needed, in one embodiment, a fill hole 800 is sealed by a separately applied disk 750, for example, aluminum. After introduction of electrolyte via fill hole 800 within a housing 100 that has been sealed by a cover 200, an appropriately dimensioned disk 750 may be provided and placed over the fill hole 800, and an ultrasonic welding process may be used to attach the disk to the housing and to seal the fill port at the direct to metal contact made between the housing and the disk. In other embodiments, other attachment means may be used, for example, laser welding, adhesives, etc. In one embodiment, disk 750 comprises a diameter of about 0.25 inches. In one embodiment, the disk 750 is placed over the fill hole 800 and does not protrude within the fill hole, for example, as when the disk comprises a flat geometry. In one embodiment, the disk 750 may comprise an indentation, or the like, that may facilitate alignment of the disk to the fill hole 800 in a manner that the disk protrudes within the fill hole and/or the housing 100.

In one embodiment, it is identified that by appropriate selection of a thickness of the disk, the disk 750 itself can act as a "fuse," which could be used in place of or in combination with longitudinal indentation 100c (FIG. 5e), in which case at some pressure, the disk 750 may be used to release electrolyte within a sealed capacitor to render the capacitor safe and non-functional. Although shown as being centrally disposed along a longitudinal axis, it is identified that because disk 750 does not necessarily need to protrude within housing 100, a fill hole and disk could be used other locations on the housing or cover.

It is identified that the void within the jelly-roll 300 can be used facilitate the flow and impregnation of electrolyte within a sealed capacitor. Because many of the collectors of the jelly-roll 300 have during an insertion step been folded over inward toward the center of the jelly-roll, thus potentially blocking flow of electrolyte from one portion of the jelly-roll to another portion, the void in the jelly-roll can be used to assist in circulating flow of the electrolyte. However, it has been identified when the metal 600 spring is attached to the jelly-roll 300, the bottom end 600b of the metal spring may block the flow of electrolyte through the void within the jelly-roll. It is identified that when a corresponding void 600d or hole (FIG. 5d) is provided in the metal 600 spring, when such void 600d is aligned to the void in the jelly-roll 300, it may subsequently facilitate flow of electrolyte within the sealed capacitor product.

In one embodiment, a housing 100, cover 200, and collector plates 60 comprise substantially the same metal, for example, aluminum. In a laser welding embodiment, respective collector plates 60 of a jelly-roll are bonded to the aluminum housing 100 and cover 200 without the use of additional bonding metal. Those skilled in the art will identify that because substantially similar housing, cover, and collector metals are bonded to each other, a galvanic effect will not be created at the bonding or welding points. Those skilled in the art will recognize that batteries are typically subject to the galvanic effect at dissimilar anode and cathode metal connection points. Due in part to the galvanic effect, batteries become polarized, and consequently must be connected through their terminals with a correct positive and negative orientation. In one embodiment, because a double-layer capacitor made by laser welding aluminum to aluminum does not utilize dissimilar metals, a battery form factor sized housing 2000 holding such a capacitor would not initially experience a polarizing effect. Accordingly, a double layer-capacitor 1200 in a battery form factor sized housing could initially be provided as a substitute for, or a supplement to, an equivalent sized battery, without necessarily needing to take into account the orientation of its terminals, which would further enhance applications that double-layer capacitors could be used in. It is understood, however, that after initial use, for example, after an initial charge cycle, a capacitor made as described herein would become polarized because a positive charge would accumulate at one collector plate and a negative charge would accumulate at another collector plate. Unless such a charged capacitor was to be subsequently completely discharged, the established polarization of the capacitor would need to be considered with continued use.

In one embodiment, it has been identified that external permanent electrical contact may sometimes be desired to be made to a battery form factor sized capacitor product. As has been described throughout, in one embodiment, a cover 200 and a housing 100 comprise aluminum. In one embodiment, it has been identified that aluminum oxidizes easily and as a consequence aluminum is a difficult metal to make electrical connections to. Without a provision for permanent electrical contacts, it is identified that contact resistance to ends of a double-layer capacitor product made of aluminum would be high, and at the high currents that double-layer capacitors may be used, excessive heat would be generated. Permanent electrical contacts to a capacitor product can be made by welding, but such welding entails high cost, both in money and time. In one embodiment, therefore, a housing 100 and/or cover 200 may be provided with a thin cladding of metal. In one embodiment, the metal is an Nickel based cladding that can be provided by BI-Lame. By providing a cover an external layer of such, cladding, it has been identified that subsequent electrical contact to the cover can be easily made, for example, by low heat soldering.

While the particular embodiments described herein are fully capable of attaining the above described advantages and objects of the present invention, it is understood that the description and drawings presented herein represent some, but not all, embodiments of the invention and are therefore broadly representative of the subject matter which is contemplated by the present invention. For example, some of the above identified principles and advantages may be applied to other energy storage devices and form factors that may exist or be developed and accepted in the future. As well, within the scope of the claims, the insulations and sealants described herein may vary or be different in other embodiments. It is therefore understood that the scope of the present invention fully encompasses other embodiments that may become obvious to those skilled in the art and that the scope of the present invention is accordingly limited by nothing other than the appended claims.

What is claimed is:

1. An energy storage device, comprising:
a housing, the housing including a fill hole; and
a seal, wherein the seal is placed against the fill hole and seals an interior of the housing from an exterior of the housing, and wherein the seal does not protrude within the interior of the housing.

2. The device of claim 1, wherein both the housing and the seal comprise a metal.

3. The device of claim 2, wherein the metal comprises aluminum.

4. The device of claim 1, wherein the seal and housing are joined by a weld.

5. The device of claim 1, wherein the seal and housing are joined by an ultrasonic weld.

6. The device of claim 1, wherein the seal makes direct surface to surface contact with the housing.

7. The device of claim 1, wherein the fluid comprises an electrolyte.

8. The device of claim 7, wherein the electrolyte comprises acetonitrile.

9. The device of claim 7, wherein the device is an ultracapacitor.

10. A capacitor, comprising:
a housing, the housing including a fill hole; and
a seal, wherein the seal is positioned against the fill hole and seals an interior of the housing from an exterior of the housing, and wherein the seal is joined to the housing by an ultrasonic weld.

11. The capacitor of claim 10, wherein the housing and the seal comprise metal.

12. The capacitor of claim 11, wherein the housing and the seal make direct surface to surface contact.

13. The capacitor of claim 10, wherein the housing contains acetonitrile.

14. The capacitor of claim 10, wherein the seal does not extend within the fill hole.

15. The capacitor of claim 10, wherein the seal does not extend within an interior of the housing.

16. The capacitor of claim 13, wherein the seal is aligned along an axis of the housing.

17. The capacitor of claim 16, wherein within the housing there is disposed a jelly-roll type electrode.

18. A method of manufacturing an energy storage device, comprising:

providing a metal housing, the housing including a fill hole;

providing a metal seal;

placing the metal seal against the fill hole; and ultrasonically welding the metal seal to the metal housing.

19. The method of claim 18, wherein prior to welding, the housing is filled with an electrolyte.

20. The method of claim 19, wherein the energy storage device comprises an ultracapacitor.

21. The method of claim 18, wherein the metal housing and the metal seal comprise aluminum.

* * * * *